(12) United States Patent
Andrews et al.

(10) Patent No.: US 6,254,278 B1
(45) Date of Patent: Jul. 3, 2001

(54) OPTICAL FIBER TUNABLE CONNECTOR ADAPTER

(75) Inventors: Scott R. Andrews, Marietta; Norman Roger Lampert, Norcross; Gregory A. Sandels, Buford, all of GA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/413,632

(22) Filed: Oct. 6, 1999

(51) Int. Cl.[7] .................................. G02B 6/00; G02B 6/36
(52) U.S. Cl. ................................................................ 385/53
(58) Field of Search ................................ 385/50–60, 147

(56) References Cited

U.S. PATENT DOCUMENTS

| | | | |
|---|---|---|---|
| 4,738,507 | 4/1988 | Palmquist | 350/96.21 |
| 5,481,634 | 1/1996 | Anderson et al. | 385/76 |
| 5,778,130 | * 8/2000 | Walters et al. | 385/134 |
| 5,930,425 | * 7/1999 | Abel et al. | 385/53 |
| 6,041,155 | * 3/2000 | Anderson et al. | 385/139 |
| 6,099,392 | * 8/2000 | Wiegand et al. | 451/41 |

* cited by examiner

Primary Examiner—Akm E. Ullah
(74) Attorney, Agent, or Firm—Thomas, Kayden, Horstemeyer & Risley, LLP

(57) ABSTRACT

A tunable adapter for joining optical fiber connectors with other elements has a housing in which are contained a fixed disc member having a connector receiving jack mounted thereon, the axis of which is surrounded by an array of indexing member. The housing further contains a movable wall member having a connector jack extending therefrom, the axis of which is surrounded by an array of indexing members adapted to mate with the indexing members on the fixed disc member. The movable wall is biased toward the disc member by means of a spring member so that, in normal operation, the indexing members are mated. When the movable wall is pulled out of engagement, it is rotatable so that the adapter may be tuned by an approximate alignment of the eccentricity vectors of the two connectors.

17 Claims, 6 Drawing Sheets

OPTICAL FIBER TUNABLE CONNECTOR ADAPTER

RELATED APPLICATIONS

This application is related to co-pending U.S. patent application Ser. No. 09/363,906 (60103-1850) and U.S. Ser. No. 09/363,908 (60103-1860), both of which were filed on Jul. 28, 1999, both of which are pending and the disclosures of which are incorporated herein by reference.

FIELD OF THE INVENTION

This invention relates to an optical fiber connector adapter and, more particularly, to a tunable adapter for minimizing insertion loss.

BACKGROUND OF THE INVENTION

In optical fiber communications, connectors for joining fiber segments at their ends, or for connecting optical fiber cables to active or passive devices, are an essential component of virtually any optical fiber system. The connector or connectors, in joining fiber ends, for example, has, as its primary function, the maintenance of the ends in a butting relationship such that the core of one of the fibers is axially aligned with the core of the other fiber so as to maximize light transmissions from one fiber to the other. Another goal is to minimize back reflections. Such alignment is extremely difficult to achieve, which is understandable when it is recognized that the mode field diameter of, for example, a singlemode fiber is approximately nine (9) microns (0.009 mm). Good aligmnent (low insertion loss) of the fiber ends is a function of the alignment, the width of the gap (if any) between the fiber ends, and the surface condition of the fiber ends, all of which, in turn, are inherent in the particular connector design. The connector must also provide stability and junction protection and thus it must minimize thermal and mechanical movement effects.

In the present day state of the art, there are numerous, different, connector designs in use for achieving low insertion loss and stability. In most of these designs, a pair of ferrules (one in each connector), each containing an optical fiber end, are butted together end to end and light travels across the junction. Zero insertion loss requires that the fibers in the ferrules be exactly aligned, a condition that, given the necessity of manufacturing tolerances and cost considerations, is virtually impossible to achieve, except by fortuitous accident. As a consequence, most connectors are designed to achieve a useful, preferably predictable, degree of alignment, some misalignment being acceptable.

Alignment variations between a pair of connectors are the result of the offset of the fiber core centerline from the ferrule centerline. This offset, which generally varies from connector to connector, is known as "eccentricity", and is defined as the distance between the longitudinal centroidal axis of the ferrule at the end face thereof and the centroidal axis of the optical fiber core held within the ferrule passage and is typically made up of three vectors. It is often the case, generally, that the ferrule passage is not concentric with the outer cylindrical surface of the ferrule (vector I), which is the reference surface. Also, the optical fiber may not be centered within the ferrule passage (vector II whose maximum magnitude is the diametrical difference divided by two) and, also, the fiber core may not be concentric with the outer surface of the fiber (vector III). Hence eccentricity can be the result of any one or all of the foregoing. The resultant eccentricity vector has two components, magnitude and direction. Where two connectors are interconnected, rotation of one of them will, where eccentricity is present, change the relative position of the fiber cores, with a consequent increase or decrease in the insertion loss of the connections. Where the magnitude of the eccentricities are approximately equal the direction component is governing, and relative rotation of the connectors until alignment is achieved will produce maximum coupling.

There are numerous arrangements in the prior art for "tuning" a connector, generally by rotation of its ferrule, to achieve an optimum direction of its eccentricity. One such arrangement is shown in U.S. Pat. No. 5,481,634 of Anderson et al., wherein the ferrule is held within a base member which maybe rotated to any of four rotational or eccentricity angular positions. In U.S. Pat. No. 4,738,507 of Palmquist there is shown a different arrangement and method for positioning two connectors relative to each other for minimum insertion loss or maximum coupling. The arrangements of these patents are examples of the efforts to achieve optimum reliable coupling, there being numerous other arrangements and methods.

In all such arrangements for achieving optimum coupling with connectors having different magnitudes and directions of eccentricities, the tuning takes place, usually, if not always prior to the final assembly of the connector. As a consequence, an installer in the field has no control over the degree of coupling, other than by trial and error. Further, tuning of the connector cannot be performed after production of the connector is completed. Thus tuning prior to final assembly of the conductor is a step in the production process.

In the foregoing cited patent applications, there are shown connectors, apparatus, and methods for tunable, fully assembled, connectors, the apparatus for determining the eccentricities of the connector or connectors, and the method and apparatus for tuning the connectors, relying upon a predetermined eccentricity vector as a reference point. The tunable connectors are then usable in the field with other connectors, whether tunable or not. Inasmuch as there exists large numbers of connectors ready for use, or already in use, that are not tunable, there exists a need for enabling an installer to make connections having a minimum insertion loss, even though the connectors themselves are not tunable. Also, where there is a large number of fiber channels, the channel balance is as important as minimum insertion loss.

SUMMARY OF THE INVENTION

The present invention is a connector adapter for abutting two connectors (or equivalents) against one another in, most commonly, a field installation, which, in itself, is tunable for achieving maximum possible signal transmissivity or minimum insertion loss between the two connectors, or for achieving channel balance.

In greater detail, the adapter comprises a housing member which has spring latch members thereon for mounting and affixing the housing to a plate or panel which generally is present in field installations. Preferably the housing member also has a key on the exterior circumference thereof for locating the housing in a particular orientation relative to the panel, usually or preferably a vertical orientation. The housing has, at one end thereof, a retaining wall which functions as a seat for a circular warped leaf spring or wave washer, the function of which will be discussed more fully hereinafter.

Within the housing intermediate the ends thereof is a wall or disc member having a centrally located jack or receptacle for receiving an optical connector. In the figures and discussion to follow, the principles and features of the invention are illustrated as configured to receive LC type connectors. However, it is to be understood that these principles and features of the invention are applicable to numerous other types of connectors such as, for example, SC, FC, and ST types, all in use today in optical fiber circuitry, as well as to other types of optical fiber type devices. The wall or disc member thus, for illustrative purposes, has a centrally located receptacle for receiving an LC type connector. The wall itself is mounted within the housing by suitable spring latch means and is stationary with respect thereto. In a circular array surrounding the centerline of the jack are a plurality of indexing projections preferably, although not necessarily twelve in number. A movable wall member is contained within the housing between the disc member and the retaining wall of the housing and has a tubular portion extending therefrom which extends through an opening in the retaining wall. The movable wall member has a connector receiving receptacle centrally located thereon and axially aligned with the receptacle on said disc member. On the rear surface of the movable wall member is a circular array of locating slots adapted to receive the indexing projections on the disc member, and surrounding the jack on said movable wall member. That is, the array, being on the opposite side of the movable wall member from the jack, surrounds the axis of the jack. The movable wall member is also a bearing surface for the leaf spring, which is located between it and the retaining wall. Thus, and as will be explained more fully hereinafter, when the movable wall is pulled to the front, i.e., toward the retaining wall to disengage the locating slots from the indexing projections, the spring is compressed and applies a restoring force so that, when the projection of the movable wall is released, the slots and projections reengage when they are aligned. A split sleeve, preferably of ceramic material, engages and maintains in alignment, the ferrules of the two connectors being joined by insertion in the two receptacles and acts to protect the polished fiber end faces when disengaged.

In operation, which generally takes place in the field, the adapter is mounted on, or in a hole in the panel, and connectors are inserted from each side. Inasmuch as it will be generally be the case that the eccentricity vectors of the connectors, both as to direction and magnitude, are different for the two connectors and it will usually be the case that the vectors will not be aligned for minimum insertion loss unless they have been pre-tuned, or by accident. Thus, as a consequence, signal transmission between the two connectors will be less than optimum. Assuming the installer has means available for ascertaining the quality of the connection, he or she may pull on the extension of the movable wall to disengage the slots from the indexing projections and rotate the movable wall relative to the disc, preferably one increment, which in the case of twelve indexing slots, is thirty degrees. The extension is then released and the spring forces the projections and slots into reengagement, now thirty degrees offset from their original position. This process can be continued until the minimum insertion loss or maximum transmission is realized or, for channel balancing, until the desired amount of loss is achieved. Because virtually all connections have some eccentricity, as explained in the aforementioned co-pending applications, it is highly unlikely that an ideal, i.e., minimum insertion loss, can be achieved. However, for the particular connectors being used, insertion loss can be reduced to approximately the minimum possible for that connection. Thus, regardless of the vector orientation and magnitude of the two connectors, the connection is optimized. After the position of the movable member relative to the disc is determined or, in other words, after the optimum angular rotation of the two connectors relative to each other is determined, the adapter remains in position until one or both connectors is changed.

The adapter of the invention can also achieve substantially the same results when one of the connectors has been pre-tuned, as taught in the aforementioned applications. On the other hand, where both connectors have been pre-tuned, the manipulation of the adapter of the invention should not be necessary since only slight improvement could be achieved.

The adapter of the invention may be equipped with an index marker so that where there is a disconnect and then re-connect of the same connectors, the operator knows what degree of rotation of one connector relative to the other is necessary for optimum signal transmission.

These and other features and advantages of the present invention will be more readily apparent from the following detailed description, read in conjunction with the drawings.

DESCRIPTION OF THE DRAWINGS

FIG. 1b is a rear view, in perspective, of the connector of FIG. 1a;

DETAILED DESCRIPTION

Figure 1A:
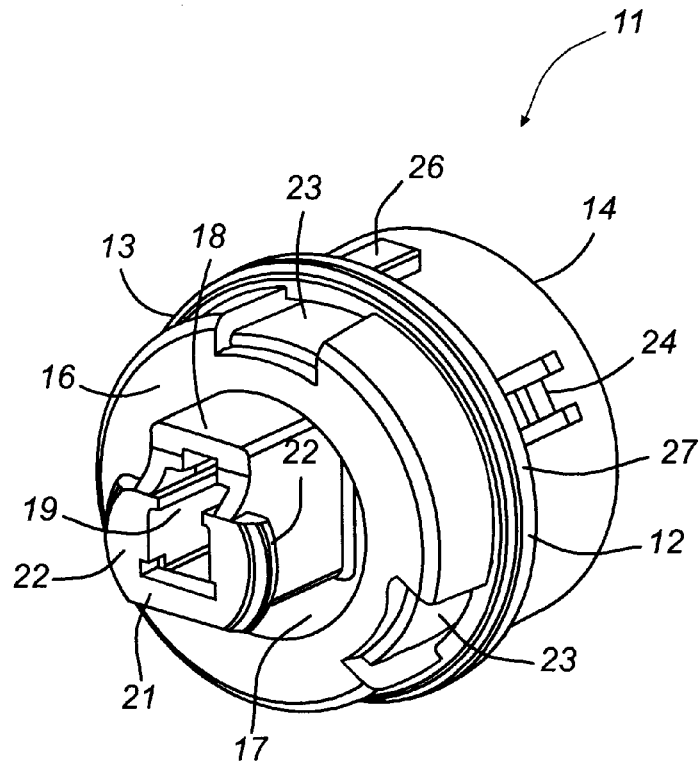
FIG. 1a is a front view, in perspective, of the assembled tunable adapter of the present invention.
Figure 1B:
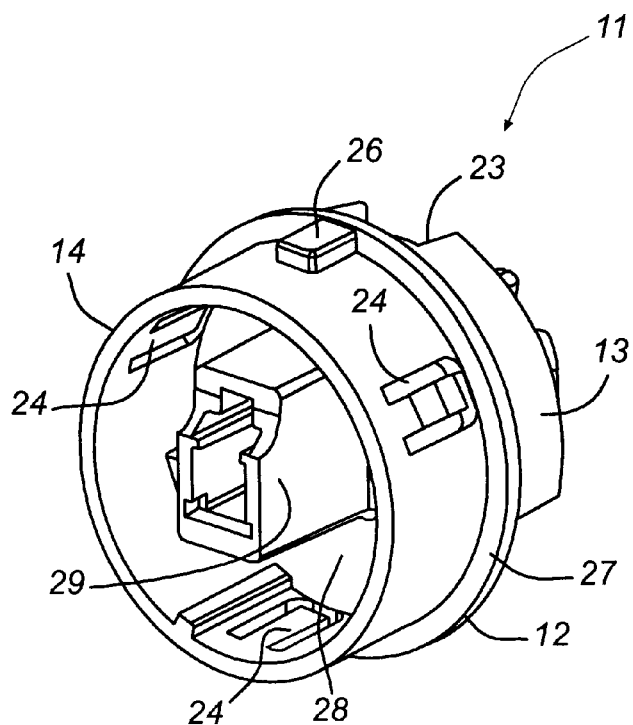

The tunable adapter 11 of the invention, as shown in FIGS. 1a and 1b comprises a housing member 12 preferably of a suitable plastic material having a front end 13 and a rear end 14. The terms "front" and "rear" are used merely as orientation descriptions, and not as definitive terms. Thus either end 13 or 14 could be considered "front" and the other end "rear".

Figure 3:
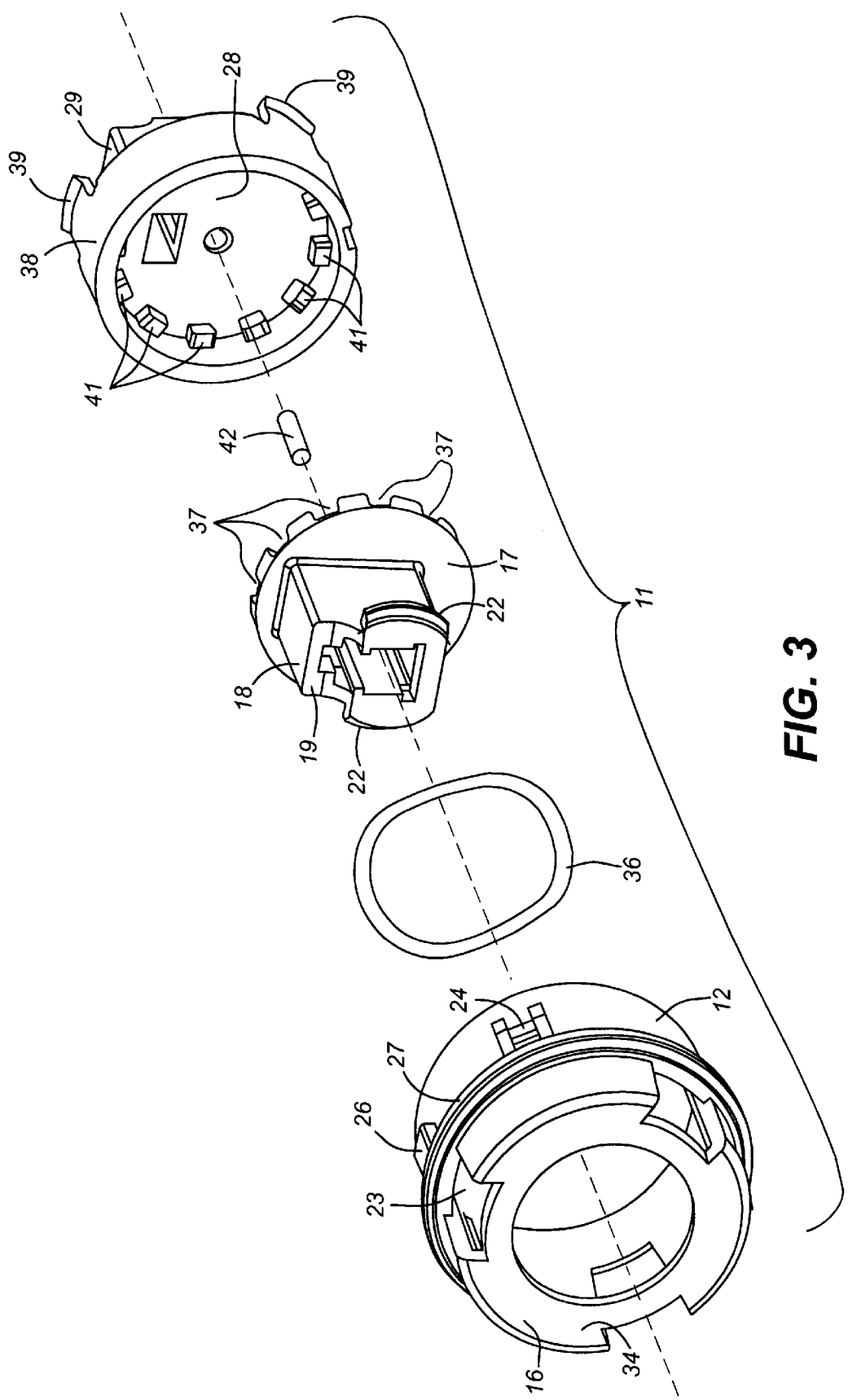
FIG. 3 is an exploded perspective view of the tunable adapter of the invention as viewed from the front thereof.

Housing member 12 is tubular or hollow, and has, at the front end thereof, a retaining wall 16 which, as will be more clear hereinafter, functions as a seat for an internal leaf spring, not shown. Internally located within housing 12 is a movable wall member 17 having an extension 18 extending therefrom which has a distal end containing a connector receiving jack 19. The outer end 21 of extension 18 (or jack 19) has flanges 22 for supplying a gripping arrangement enabling the operator or installer to grip and pull extension 18, and hence movable wall 17 toward the front, as explained in the foregoing and hereinafter. Housing 12 also has latching windows 23, for receiving latching members 39 as shown in FIG. 3, for example. In addition, latches 24, only one of which is shown, which may take the form of spring cutouts, are used to latch housing 12 to the panel. A key 26 is provided which fits within a keyway in the panel to orient the housing 12. Key 26 also prevents rotation of the assembly in the panel 31. A circular flange 27 surrounds housing 12 and functions as a stop by bearing against the panel when housing 12 is latched thereto.

Mounted within housing 12 intermediate ends 13 and 14 is a fixed wall or disc 28, attached to the interior of housing 12 by suitable means, such as latches, not shown, and extending therefrom is a connector jack 29, which is axially aligned with jack 19.

Figure 2A:
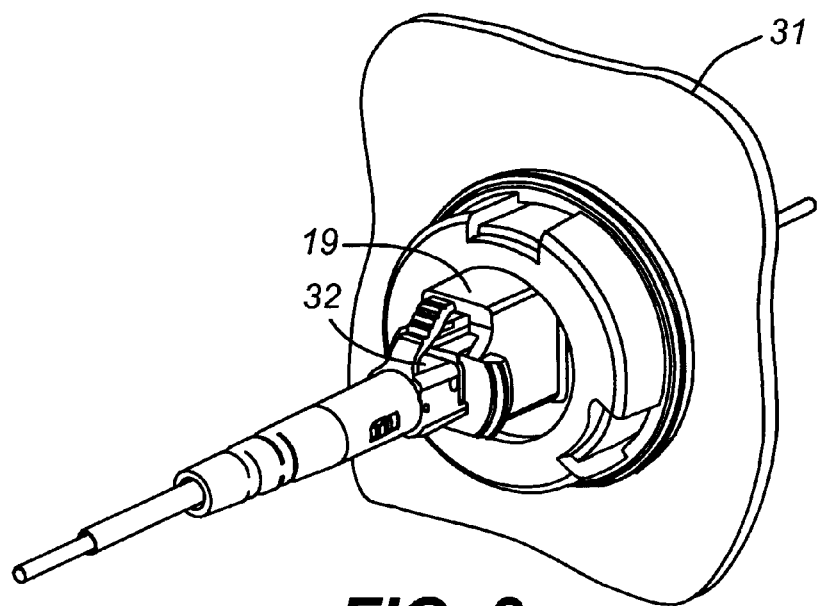
FIG. 2a is a front view, in perspective, of the adapter as mounted on a panel with a connector in place.
Figure 2B:
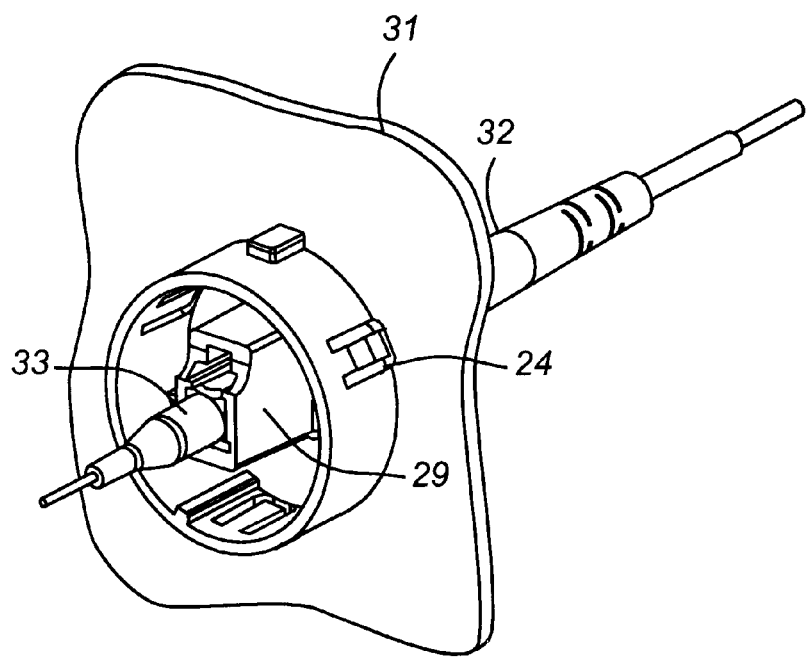
FIG. 2b is a rear view, in perspective, of the adapter of FIG. 2a with a second connector in place.

FIGS. 2a and 2b are front and rear perspective views of adapter 11 as mounted on a panel 31 with connectors 32 and 33 plugged into their respective jacks 19 and 29.

Figure 4:
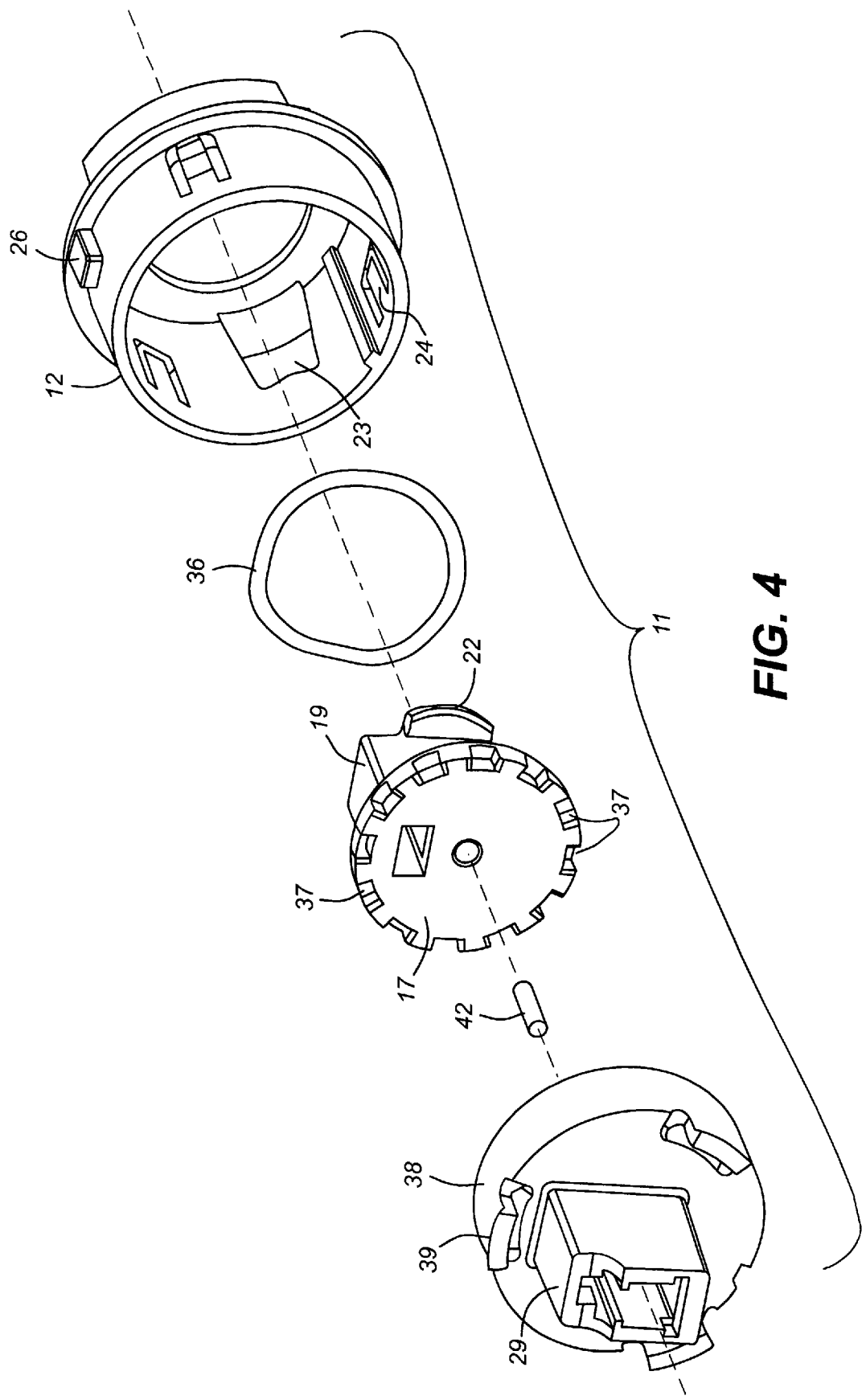
FIG. 4 is an exploded perspective view of the tunable adapter of the invention as viewed from the rear thereof.

The component parts of tunable adapter 11 are shown in FIGS. 3 and 4, which are, respectively, front and rear exploded perspective views thereof. As can be seen in these figures, retaining wall 16 of housing 12 has a bore 34 therein to allow passage of extension 18 there through. When movable wall member 17 is inserted into housing 12, a warped, approximately circular leaf spring 36 is trapped between the inner surface of retaining wall 16 and the front surface of movable wall member 17. The bias of spring 36 is such that it exerts force to separate walls 17 and 16. On the rear surface of movable wall 17 is an array of slots 37 preferably surrounding the axis of connector 19. The number of slots is preferably twelve, it having been found that the thirty degree increments of rotation thus created produce excellent fine tuning results. An indexing disc 28 is mounted in a support ring 38 which has a plurality of latching members 39 for affixing disc 28 inside of housing 12. A jack 29 extends from the rear face of disc 28 and the front face thereof has an array of projections or lugs 41 which surrounds the centerline of jack 29. Projections or lugs 41 are sized and arrayed to fit within the individual slots 37 in any of the twelve rotational positions. It is not strictly necessary that there be the same number of projections 41 as there are slots 37. As a matter of fact, just one projection could be used. However, having twelve projections 41 for twelve slots 37 insures a more rugged and stable rotational positioning of wall 17 relative to disc 28. A split sleeve 42, preferably of ceramic or other material, is used to fit over and align the ferrules of the connectors in jacks 19 and 29, as is best seen in FIGS. 5 and 6.

Figure 5:
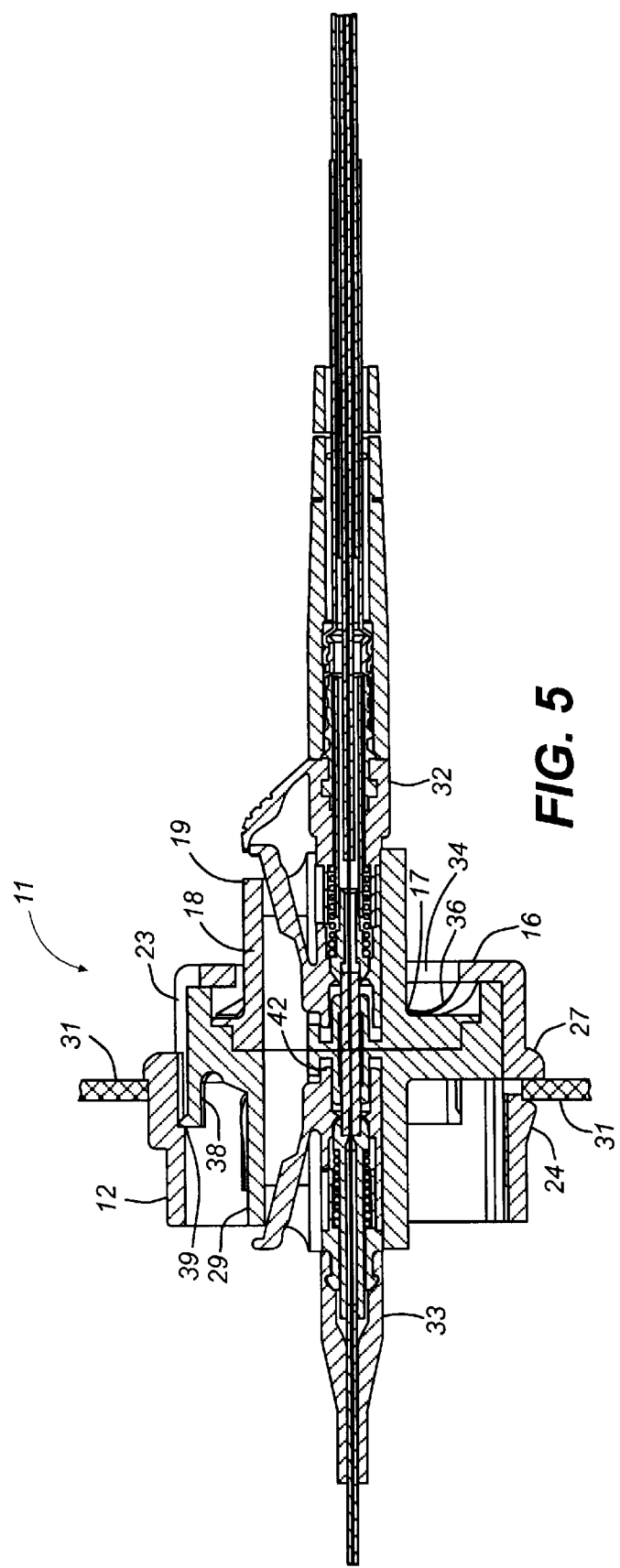
FIG. 5 is a side elevation cross-sectional view of the adapter of the invention in its operative configuration.

FIG. 5 depicts, in cross-section, the adapter 11 of the invention in its operative configuration, with connectors 32 and 33 inserted therein with their ferrules aligned in sleeve 42 and with the ferrule ends in abutting relationship for signal transfer across the junction.

Figure 6:
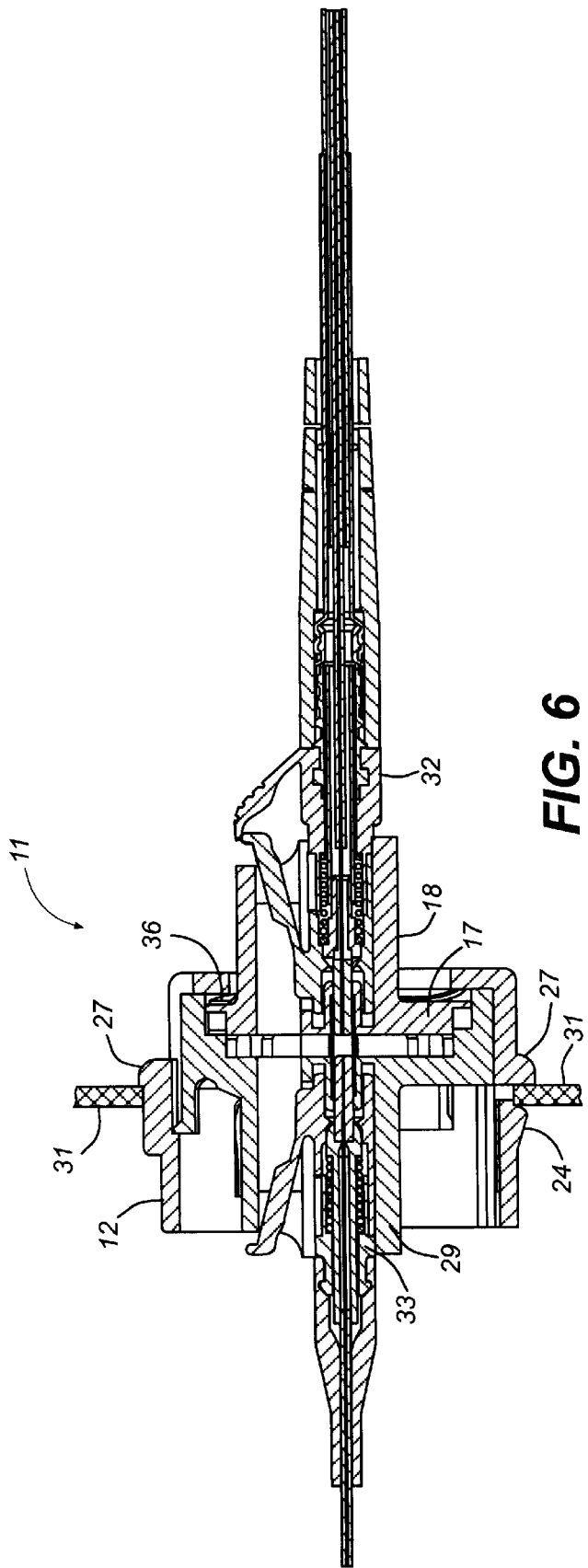
FIG. 6 is a side elevation cross-sectional view of the adapter in its configuration for the tuning or adjusting thereof.

FIG. 6 discloses the arrangement of FIG. 5 with the movable wall member 17 pulled forward to disengage the ferrules and, also, the slots 37 and the lugs or projections 41. In this configuration, wall member may be rotated as discussed hereinbefore to effect the tuning of the adapter of the invention to minimize insertion loss or, conversely, to maximize signal transmission.

In all of the foregoing, the various components are preferably made of a hard plastic, except for spring 36 and sleeve 42, for wear resistance and for ease of manufacture. It is to be understood that various of these components may take other forms, such as slots 37 and lugs or projections 41 may be holes and pins, respectively. Further, movable wall 17 may have the projections whether lugs or pins, mounted thereon and wall or disc 28 may have the slots or holes. Further, different means for mounting the adapter to the panel may be used, the prior art being replete with sundry mounting arrangements. Although the adapter 11 is shown as a circular member, other shapes may be used in the interest of space economy, so long as there is adequate room for rotating the connectors relative to each other, preferably in incremental steps.

In conclusion, it should be noted that it will be obvious to those skilled in the art that many variations and modifications may be made to the preferred embodiment as shown herein without substantial departure from the principles of the invention, and thus will remain within the scope of the invention. It is intended that all such variations and modifications be included within the scope of the invention as set forth in the claims. In the claims hereinafter, the corresponding structures, materials, acts, and equivalents of all means or step plus function elements are intended to include any structure, material, or acts for performing the functions without specifically claimed elements.

What is claimed is:

1. A tunable adapter for providing selectable insertion loss in optical fiber connections, said adapter comprising:

a hollow housing member having a first end and a second end;

a retaining wall at said first end having an opening therein;

a disc member affixed within said housing member intermediate the ends thereof, said disc member having front and rear surfaces and a centrally located connector jack extending from said rear surfaces toward said second end of said housing;

said disc member being mounted within a support ring;

said disc member having at least one indexing member on said front surface thereof;

a movable wall member having front and rear surfaces, and an extension on said front surface having a distal end containing a centrally located connector adapter;

said rear surface of said movable wall member having a plurality of indexing members adapted to mate with the indexing member on said disc;

a resilient member located between said retaining wall and said movable wall member for forcing said indexing members into mating relationship; and at least one latching member for mounting said housing to a panel.

2. The tunable adapter as claimed in claim 1 and further including stop means on the exterior of said housing adapted to bear against the panel.

3. The tunable adapter as claimed in claim 2 wherein said stop means comprises a circular flange.

4. The tunable adapter as claimed in claim 1 and further comprising a key member on the exterior of said housing for orienting said adapter on the panel.

5. The tunable adapter as claimed in claim 1 wherein said disc member has a plurality of indexing members arrayed about the centerline of said connector jack.

6. The tunable adapter as claimed in claim 5 wherein said indexing members are lugs projecting from said front face of said disc member.

7. The tunable adapter as claimed in claim 5 wherein there are at least twelve indexing members.

8. The tunable adapter as claimed in claim 7 wherein said indexing members are evenly spaced 30° apart in a circular array.

9. The tunable adapter as claimed in claim 1 wherein said plurality of indexing members on said rear surface of said movable wall member comprise a plurality of slots.

10. The tunable adapter as claimed in claim 8 wherein there are twelve slots.

11. The tunable adapter as claimed in claim 10 wherein said slots are evenly spaced 30° apart in a circular array.

12. A tunable adapter for providing selectable insertion loss in optical fiber connections, said adapter comprising:

a hollow housing member having a first end and a second end and an exterior surface;

a retaining wall at said first end having an opening therein;

a support ring;

means for mounting said support ring in said housing member;

a disc member having front and rear surfaces mounted in said support ring;

said disc member having a centrally located connector jack located on said rear surface and extending toward said second end of said housing member;

said disc member having a plurality of indexing members on said front surface thereof;

a movable wall member having front and rear surfaces within said housing member, said movable wall member having an extension on said front surface having a distal end and forming a connector adapter;

spring means between said retaining wall and said movable member for biasing said movable wall member toward said disc member;

said distal end of said extension having flanges thereon for providing a gripping means;

said rear surface of said movable wall member having a plurality of indexing members thereon adapted to mate with said indexing members on said disc member;

at least one mounting member on the outer surface of said housing member for affixing it to a panel stop means on said outer surface of said housing member for seating said tunable adapter on the panel; and a locating member on said housing member for orienting and preventing rotation of it on the panel.

13. A tunable adapter as claimed in claim 12 wherein said indexing members on the front surface of said disc member comprises lugs extending from said front face.

14. A tunable adapter as claimed in claim 13 wherein there are twelve lugs spaced thirty degrees apart in a circular array surrounding the centerline of said connector jack.

15. A tunable adapter as claimed in claim 12 wherein said indexing members on said rear surface of said movable wall member comprises slots thereon.

16. A tunable adapter as claimed in claim 15 wherein there are twelve slots spaced thirty degrees apart in a circular array surrounding the centerline of said connector adapter.

17. A tunable adapter as claimed in claim 12 wherein said locating member is a key located on said exterior surface of said housing.

* * * * *